(12) United States Patent
Schedlinski et al.

(10) Patent No.: US 6,594,852 B1
(45) Date of Patent: Jul. 22, 2003

(54) CLEANING DEVICE, IN PARTICULAR, FOR GRILLING APPLIANCES OR THE LIKE

(76) Inventors: Jürgen Schedlinski, Lindenstrasse 42, D-19294 Niendorf (DE); Stephan Recknagel, Langenalber Strasse 103, D-75334 Straubenhardt (DE)

( * ) Notice: Subject to any disclaimer, the term of this patent is extended or adjusted under 35 U.S.C. 154(b) by 0 days.

(21) Appl. No.: 09/926,277
(22) PCT Filed: Apr. 5, 2000
(86) PCT No.: PCT/EP00/03001
  § 371 (c)(1),
  (2), (4) Date: Oct. 5, 2001
(87) PCT Pub. No.: WO00/59352
  PCT Pub. Date: Oct. 12, 2000

(30) Foreign Application Priority Data
  Apr. 7, 1999 (DE) ..................... 299 06 210 U

(51) Int. Cl.⁷ ............................................... A47L 13/02
(52) U.S. Cl. ............... 15/236.06; 15/236.07; 15/236.09; 15/104.04; 30/169; 30/172
(58) Field of Search .................. 15/104.04, 236.01, 15/236.05–236.09; 30/169, 172; D32/46, 49

(56) References Cited

U.S. PATENT DOCUMENTS

| | | | | |
|---|---|---|---|---|
| 520,818 A | * | 6/1894 | Bettinger | 15/236.06 X |
| 2,118,923 A | * | 5/1938 | Hansen | 15/236.07 |
| 2,392,490 A | * | 1/1946 | Maruri | 15/104.04 |
| 2,475,514 A | * | 7/1949 | Plumley | 15/236.06 |
| 2,681,504 A | * | 6/1954 | Fox | 30/123 |
| 2,722,148 A | | 11/1955 | Woyton | 294/99.2 |
| 2,888,700 A | * | 6/1959 | McClanahan | 15/236.05 |
| 4,282,625 A | | 8/1981 | Hulett | 15/236.06 |
| 4,287,631 A | * | 9/1981 | Marrs | 15/236.05 X |
| 5,735,014 A | | 4/1998 | Noga | 15/236.06 |

FOREIGN PATENT DOCUMENTS

GB   767456   *  6/1957   ............. 15/236.06

* cited by examiner

Primary Examiner—Mark Spisich
(74) Attorney, Agent, or Firm—Brezina & Ehrlich

(57) ABSTRACT

A cleaning device for cleaning a grate bar comprising a pair of tongs having two limbs held in an opened position, and being squeezable into a working position by hand-applied force. A holding element at a free end of each limb. The holding elements are disposed such that: (1) when the tongs are in the opened position, there is no overlap between the holding elements, which are separated by a distance that is larger than the diameter of a grate bar, and the free ends are separated by a distance which is smaller than the distance between adjacent grate bars; and (2) when the tongs are in the working position, the holding elements overlap. The cleaning device includes, at the free ends of the limbs, a cleaning element in the form of at least one flexible cleaning cable which can be at least partially wrapped around the grate bar.

10 Claims, 4 Drawing Sheets

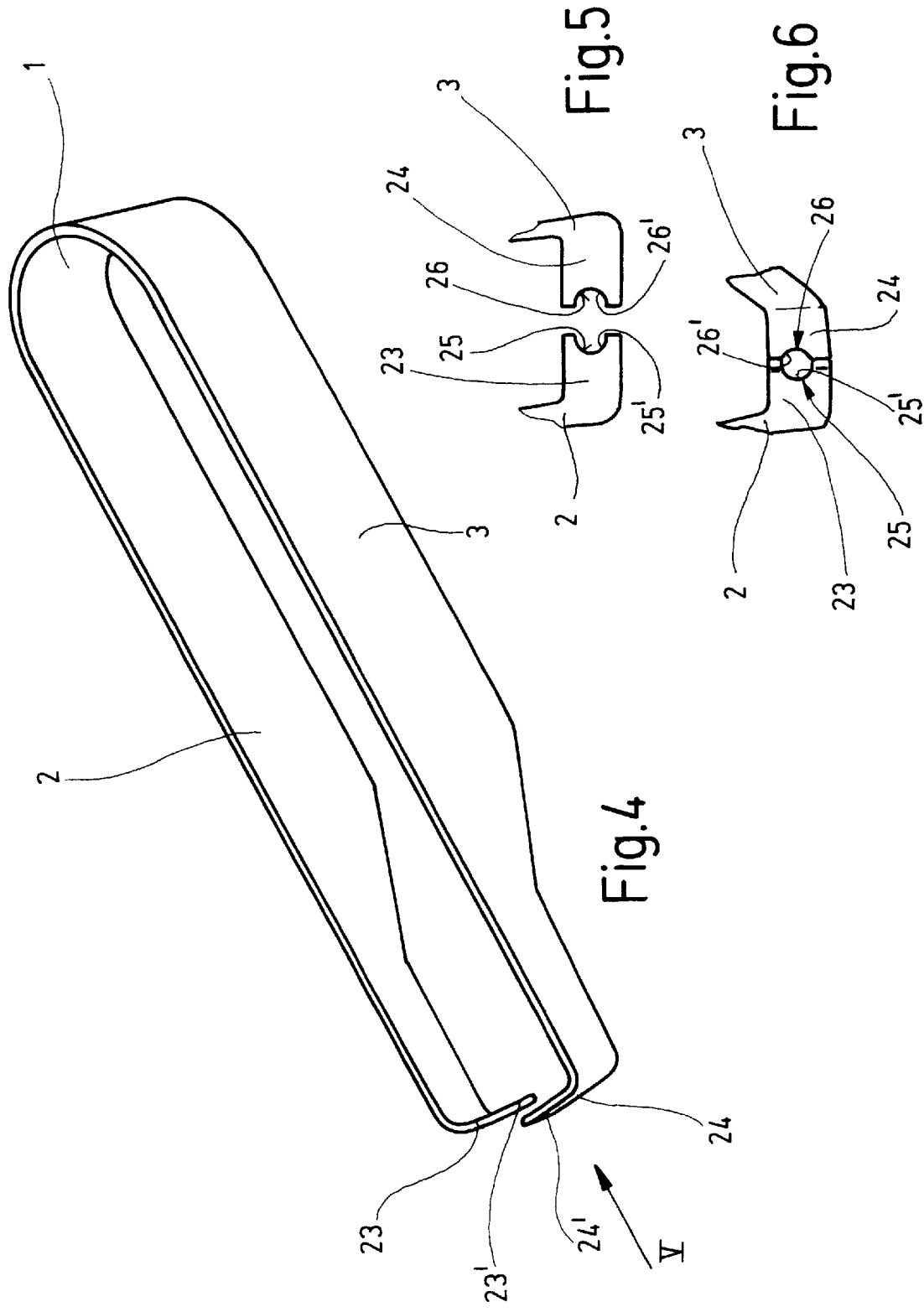

CLEANING DEVICE, IN PARTICULAR, FOR GRILLING APPLIANCES OR THE LIKE

The invention relates to a cleaning device, in particular, for grilling appliances or the like.

Such devices are used for the individual cleaning of gratings encountered in particular in cooking or grilling appliances.

Cleaning such gratings proves to be problematic. After use, the grate bars are covered with food remains and burned fat which cannot be removed while the grate bars are still hot. But once they have cooled down, the fat has solidified and cannot or only with great effort be removed with simple wiping cloths.

It is well known to use hand brushes for the cleaning of such gratings. Such a cleaning brush is described, e. g., in DE-OS 28 44 832. Cleaning brushes clean only insufficiently, wear out fast and therefore have only a short life, beside being uneasy to handle.

It is also known from the prior art to use cleaning scrapers. Such a scraper is known from DE 23 05 353.0 U1. It comprises a handle and a scraping blade having on its front edge several recesses of various sizes. These recesses are sized in relation to many possible diameters of the grate bars. The cleaning with such a scraper is unsatisfactory and complex, since the respective recess of the cleaning scraper does not embrace the grate bars, but only provides two contact points with one of them. For the complete cleaning of the upper circumferential surface of the grill bars, the cleaning scraper must be turned around several times and used under constant changing of the setting angle, and must frequently be cleaned. The lower surfaces of the grate bars remain completely uncleaned.

From DE 84 01 758.9 U1 an improved cleaning scraper is known, designed as scissors and provided with free limbs having semicircular-shaped recesses facing each other. Two of such recesses form a round aperture for cleaning in the squeezed together position of the scissors. The scissors are provided with several recesses with different diameters and hence can fit to differently sized grate bars. This type of device also does not meet the requirements. It is applicable only to grate bars having the appropriate corresponding diameter. Their use is therefore rather limited. Moreover, the grate bars are only insufficiently cleaned since, in order to allow free movement, there has to be an annular void between the recesses of the scissors and the grate bars and dirt stays on the grate bars in a thickness corresponding to the annular void. These scissors are also difficult to handle, since a force must be applied by hand for shifting the scissors with lateral distance to the grate bars to be ceased. This is uneasy and leads to tilting the cleaning scissors.

If is the object of the present invention to develop a cleaning device with an adaptable cleaning edge, so designed as to at least partially embrace the grate bars, and to fit to all grate bar diameters, and which is easy to handle.

According to the invention, this object is achieved in that the cleaning device comprises a pair of tongs having two limbs, said limbs being held in an opened position by means of a tension of their own, and being squeezable together into a working position by means of a force applied by hand, said limbs comprising each, on their free ends, a holding element which is oriented in a transversal and inwardly directed manner, whereby both holding elements can pass by one another, when the tongs are in said opened position, a negative overlap exists between both holding elements, said overlap being larger than the diameter of a grate bar to be cleaned, and said free ends of both limbs having an outer distance which is smaller than the inner distance between two neighbouring grate bars, when the tongs are in said working position, a positive overlap occurs between the holding elements, whereby said cleaning device has, on its free ends, a cleaning element, said cleaning element being able to be at least partially wrapped around the grate bar to be cleaned.

The cleaning device of the present invention is characterized in an advantageous manner by a high cleaning efficiency. This efficiency is to be attributed to the fact that the cleaning element essentially wraps tightly around the grate bar and separates the dirt from the grate bar like a cutting tool, thus avoiding a transport of the dirt on the surface of the grate bar and hence a smearing of the dirt as it occurs with scrapers. Moreover, the squeezing force on the cleaning element can be increased by changing the force applied by hand and adjusted to different conditions so as to improve the quality of the cleaning. The cleaning device is virtually applicable to every grating even with different grate bar diameters. This feature increases in favorable manner the area of application of the cleaning device according to the invention. The handling of the device is extremely simple. Each grate bar can be cleaned on a single step without undue effort. Moreover, the cleaning device can be used in such a way that the separated dirt falls directly again into the grill fire.

In an advantageous development of the present invention, the cleaning element is a cleaning cable, in particular a cleaning cable designed as a multicore wire of the type used, e. g., as a steelwire rope for fishing predatory fish. Such a cleaning element is very hardwearing and flexible.

In a further advantageous development of the present invention the cleaning cable has an excess length, serving as a reserve cable attached at one of the two limbs and used as a supply for renewing the cleaning cable. Also, the cleaning device of the present invention can be easily combined with well-known and regularly used grill tongs.

In a further advantageous development of the present invention at least one of the holding elements is provided with a recess, said recess having a cleaning edge, so that, in a particularly simple manner, the dirt adhering to the grate bars is removable.

In a further advantageous development the cleaning edge of the recess of the holding element has a semicircular, a semi-elliptic, a curved or a polygonal form. Such a cleaning device can advantageously be used for grill bars of different diameters in a particularly simple manner.

Further advantageous developments of the present invention are described in the dependent claims.

Further details and advantages of the present invention will become apparent from the following embodiments which are described referring to the drawings in the following.

FIG. 4 shows a perspective view of a third embodiment of the present invention;

FIG. 5 shows a front view of the third embodiment of the present invention, along direction V as indicated on FIG. 4, in its opened position;

FIG. 6 shows a front view of the third embodiment of the present invention in the working position.

Figure 1:
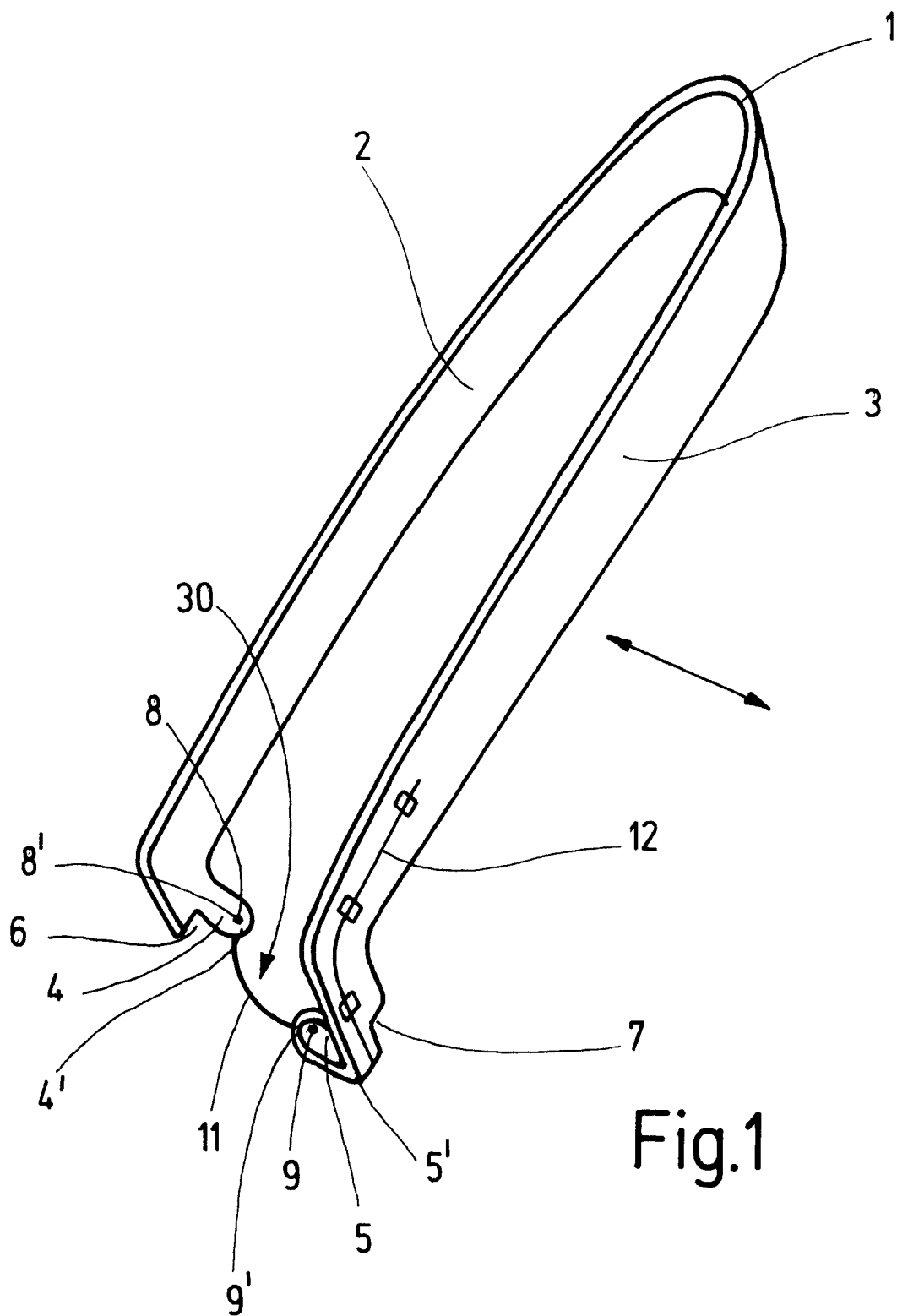
FIG. 1 shows a perspective view of a first embodiment of the present invention, in the opened position.
Figure 2:
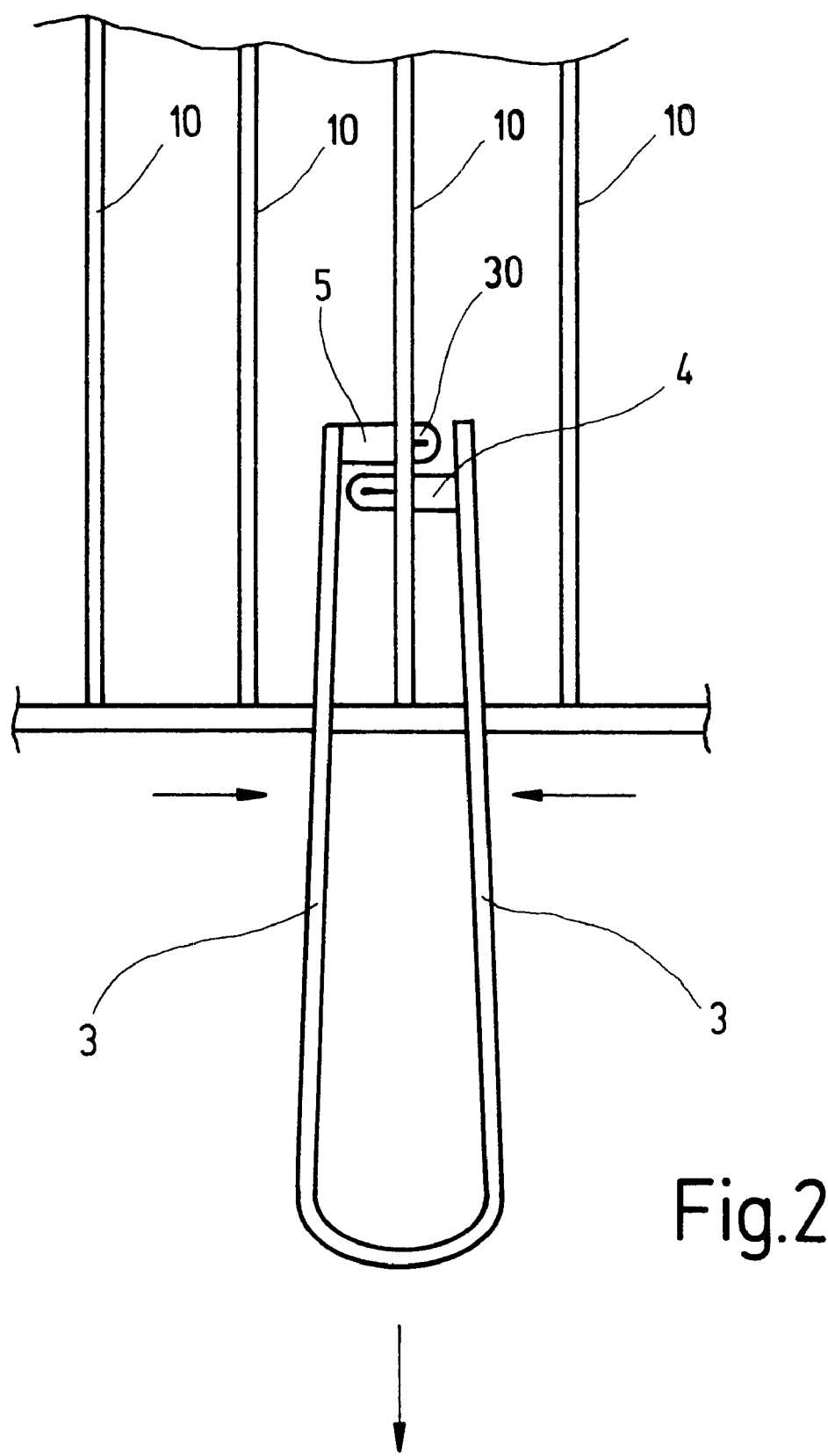
FIG. 2 shows a top view of the first embodiment of the present invention, in the working position.

In the first embodiment of the present invention as shown in FIGS. 1 and 2, the cleaning device is tongs-like made of one piece thereby provided with two limbs 2 and 3 connected by a curved part 1, which are held in an opened position by means of tension of their own and can be squeezed together into a working position by overcoming this internal tension by means of a force applied by hand.

Each limb 2,3 comprises, on the free ends thereof, a holding element 4,5, which is oriented in a transversal and inward manner. Both holding elements 4,5 are preferably located in a same plane but at a different distance form the curved part 1, so that they can pass by one another in a motion to the working position. Each limb 2,3 is provided with a recess 6,7 which is assigned to the opposite holding element 4,5 and which therefore forms a free space for the opposite holding element 4,5 in the squeezed together position of the cleaning device. Thus, the free end 4', 5' of the respective holding element 4,5 can fit in this free space allowing squeezing of the limbs 2,3 to a stop.

Each holding element 4,5 has, on the free ends 4', 5' thereof, a cleaning element 30 that can at least partially wrap around the grate bar 10 to be cleaned (see FIG. 2). For retaining the cleaning element 30, which is in this first embodiment a cleaning cable 11, the free ends 4', 5' of the holding elements 4,5 have respectively a mounting hole 8, 9 functioning as mounting points 8', 9' for the cleaning cable 11. The arrangement of the two mounting holes 8,9 is so determined in relation to the way to the working position of the two limbs 2,3 that both mounting holes 8,9 are in a negative overlap position, one relative to the other, when the limbs 2,3 are in the opened position, and in a positive overlap position one relative to the other when the limbs 2,3 are in the working position. The negative as well as the positive overlap are larger than the diameter of the grate bars 10 to be cleaned of a grilling appliance. The cleaning cable 11 goes through both mounting holes 8,9. A knot at each free end of the cleaning cable 11 prevents it from passing all the way out of the holes 8,9. In an advantageous manner, the cleaning cable 11 is made of a flexible multi-core wire with a diameter approximately between 0,3 and 0.5 mm. However, it can be generally made of other material, either natural or plastic. The cleaning cable, 11 can be provided with an excess length, which is fastened as a reserve cable 12 on the side of one of the two limbs 2,3.

Figure 3:
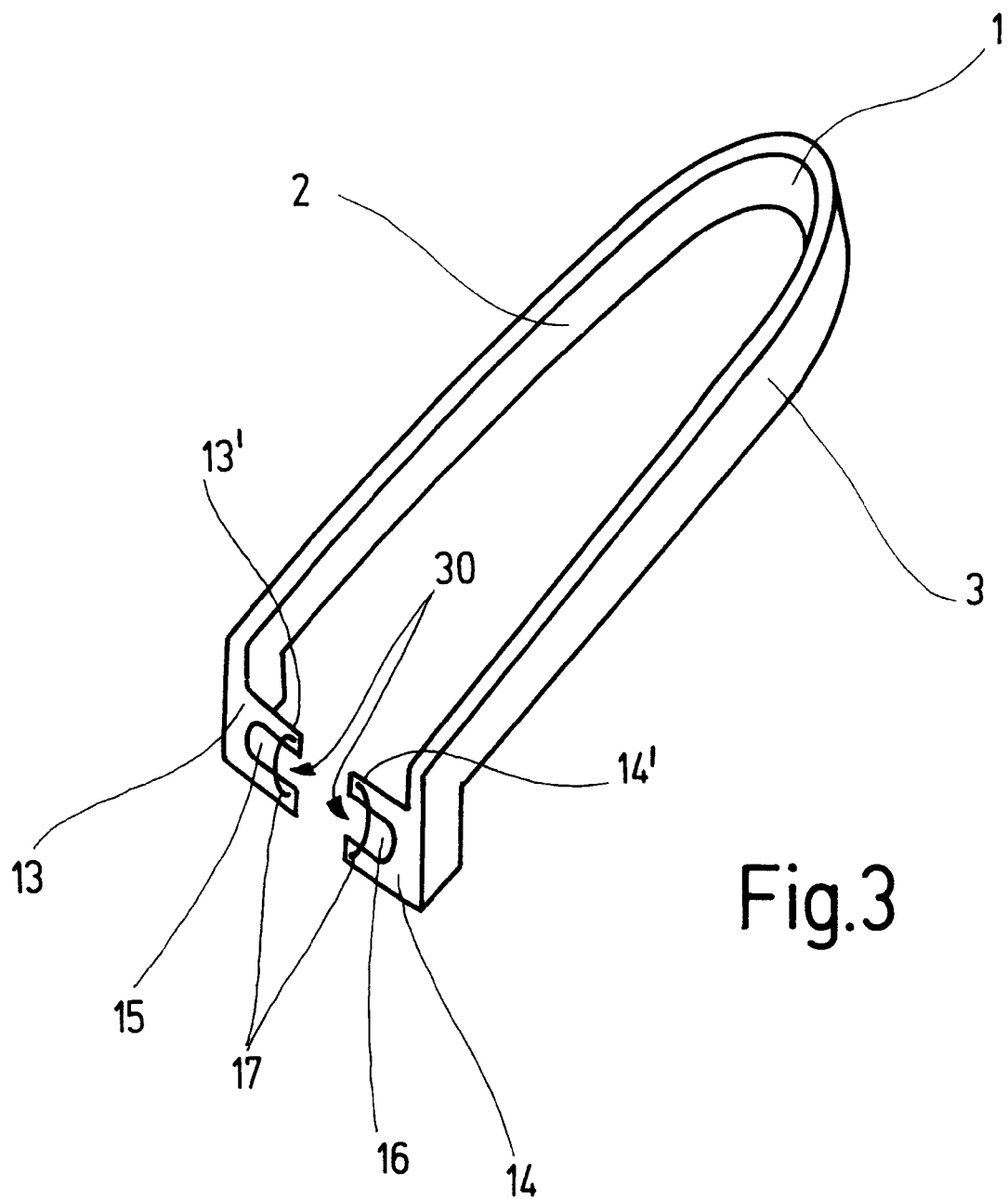
FIG. 3 shows a perspective view of a second embodiment of the present invention.

A second embodiment of the present invention, as shown in FIG. 3, has holding elements 13, 14 comprising recesses 15, 16 opposite to each other. Each of these recesses 15, 16 is closed at the open end by a flexible cleaning cable 17. In the second embodiment of the cleaning device, the two holding elements 13, 14 are again located at a different distance from the curved part 1 so that they can pass by one another in their closing motion to the working position and have a positive overlap between the two holding elements 13, 14 in the working position. Together, both flexible cleaning cables 17 form the cleaning element 30 of the cleaning device as shown in FIG. 3, and they almost completely wrap around the grate bar 10 to be cleaned.

The outer distance between the two limbs 2 and 3 of the cleaning device in its opened position is again smaller than the inner distance between the two grate bars neighbouring the grate bar 10 to be cleaned.

For cleaning the grate bars 10, of a grill appliance for example, the cleaning device as shown in FIG. 1 is held in one hand and put from above successively on each grate bar 10, so that the cleaning cable 11 comes into contact with the grate bar 10. By light pressure on the grate bar 10 and by the simultaneous operation of the two limbs 2,3 of the cleaning device, the holding elements 4,5 come underneath the grate bar 10 into their positive overlap position, so that the cleaning cable forms a loop and completely wraps itself around the grate bar 10.

In the cleaning device according to FIG. 3, the grate bar 10 is surrounded on both sides by each cleaning cable 17 and is completely wrapped around by the overlap of these two cleaning cables 17.

The tension of the cleaning cables 11,17 of both embodiments of the present invention can be varied by the external pressure applied on the two limbs 2,3. Afterwards, the cleaning device is pulled and/or shifted once or several times over the entire length of each grate bar 10 until all dirt is removed from it.

Now, a third embodiment of a cleaning device is illustrated in FIGS. 4 to 6, which represents a modification of the cleaning device of the FIG. 3, so that components corresponding to each other can be referred to by the same reference numeral and do not need to be described again. As before, two holding elements 23, 24 are oriented in a transversal and inwardly directed manner and at a different distance from the curved part 1 connecting the two limbs 2 of the tongs-like cleaning device, in such a way that, as is best seen in FIG. 6, in the working position a positive overlap occurs between the two holding elements 23, 24.

The main difference of the cleaning device in accordance to the third embodiment compared to the cleaning device according to FIG. 3 lies in the fact that the cleaning element 30 is not constituted of the two cleaning cables 17 acting together, but that recesses 25, 26 in the free ends 23', 24' of the holding elements 23, 24 corresponding to the recesses 15, 16 of the second embodiment are provided each with a cleaning edge 25', 26', which take over the function of the cleaning cable 11 of the first embodiment or of the cleaning cables 17 of the second embodiment. Preferably, the outline of the co-operating cleaning edges 25', 26' of the two recesses 25, 26 is semicircularly shaped, as is shown in FIG. 5. However, it is also possible to use a semi-elliptical or a curved form. Also, the cleaning edges 25', 26' may have the form of a polygon. The outline of at least one cleaning edge 25', 26' is preferably chosen so as to allow that grate bars 10 of different diameters can be received by the cleaning element 30 essentially made of the two cleaning edges 25', 26'.

For cleaning the grate bars 10, of a grilling appliance for example, with the cleaning device shown in FIGS. 4 to 6, the limbs 2, 3 are held in one hand and positioned from above or from below on both sides of the grate bar 10 to be cleaned in such a manner that the grate bar 10 finds itself approximately centered in between the two recesses 25, 26 of the free ends 23', 24' of the holding elements 23, 24. By squeezing the two limbs 2, 3 of the cleaning device together both holding elements 23, 24, and thus also the two recesses 25', 26', are moved from their, opened position shown in FIG. 5 into their working position shown in FIG. 6 with the grate bar 10 to be cleaned being embraced, at least partially and preferably completely, by the recesses 25, 26 of the two holding elements 23, 24 which overlap positively in the working position. In case of an incomplete enclosure of the grate bar 10 to be cleaned, the area of the grate bar 10 not worked upon by the cleaning edge 25', 26' can be easily reached by turning the cleaning device around its longitudinal axis, preferably while maintaining the setting angle. Since, as previously mentioned, the outer distance between the free ends of the limbs 2, 3 is smaller than the inner distance between neighbouring grate bars 10, the cleaning device can be displaced essentially completely in its longitudinal direction between neighbouring grate bars 10, so that unfavorable tilting is avoided in an advantageous manner with the described cleaning device.

What is claimed is:

1. A cleaning device for cleaning a grate bar, comprising a pair of tongs having two limbs held in an opened position by tension, and being squeezable together into a working position by hand-applied force, said limbs each comprising a free end with the free ends disposed generally opposite to each other, and an opposite end which is connected to the opposite end of the other limb, a holding element being disposed at the free end of each said limb which is oriented in a direction transverse to the limb and inwardly toward the other free end, wherein the holding elements are disposed such that:

when the tongs are in the opened position, there is not an overlap between the holding elements, which are separated by a distance that is larger than the diameter of a grate bar to be cleaned, and the free ends are separated by a distance which is smaller than the distance between adjacent grate bars to be cleaned, and when when the tongs are in the working position, the holding elements overlap, said cleaning device further comprising, at the free ends of the limbs, a cleaning element comprising at least one flexible cleaning cable, and constructed and arranged to be at least partially wrapped around the grate bar to be cleaned.

2. The cleaning device according to claim 1, wherein each of said holding elements comprises a mounting point, and said flexible cleaning cable is fastened to said mounting points to thereby connect said holding elements, said mounting points overlapping when the tongs are in the working position by a distance larger than the diameter of the grate bar to be cleaned.

3. The cleaning device according to claim 2, wherein said mounting points are each formed as a mounting hole at the free end of each of said holding elements.

4. The cleaning device according to claim 3, wherein said cleaning cable is passed through the mounting holes and is secured by a knot at free ends of the cleaning cable.

5. The cleaning device according to claim 1, wherein at least one of said holding elements is provided with a recess in front of which the grate bar to be cleaned can be positioned in the opened position of the tongs, said recess in the working position at least partially wrapping around the grate bar to be cleaned.

6. The cleaning device according to claim 5, wherein each of said holding elements is provided with one said recess and said cleaning element comprises two cables, each of said holding elements being provided with one said cable fastened thereto adjacent an open end of the recess of the holding element.

7. The cleaning device according to claim 1, wherein said cleaning cable is formed of a multi-core wire having a diameter of approximately 0.3–0.5 mm.

8. The cleaning device according to claim 1, wherein said cleaning cable is provided with excess length which constitutes a reserve cable.

9. The cleaning device according to claim 1, wherein the holding elements are arranged at different distances from a curved part connecting said two limbs.

10. The cleaning device according to claim 1, in combination with a pair of grill tongs.

* * * * *